United States Patent [11] 3,622,548

| [72] | Inventors | Hans Emde;<br>Kurt Benedikter; Peter Hegenberg, all of<br>Marl, Germany |
|---|---|---|
| [21] | Appl. No. | 664,908 |
| [22] | Filed | Sept. 1, 1967 |
| [45] | Patented | Nov. 23, 1971 |
| [73] | Assignee | Chemische Werke Huels A.G.<br>Marl, Germany |
| [32] | Priority | Sept. 2, 1966 |
| [33] | | Germany |
| [31] | | C 40009 |

[54] POLYMERS AND CATALYST COMPOSITIONS
15 Claims, No Drawings

[52] U.S. Cl. ..................................................... 260/80.78,
252/429, 252/431, 260/88.2
[51] Int. Cl. ..................................................... C08f 1/56,
C08f 15/04
[50] Field of Search ........................................... 260/80.78,
88.2, 93.7, 94.9 C; 252/429, 431

[56] References Cited
UNITED STATES PATENTS

| 3,317,499 | 5/1967 | Nakaguchi et al. ............ | 260/93.7 |
|---|---|---|---|
| 3,234,383 | 2/1966 | Barney ......................... | 260/80.5 |
| 3,301,834 | 1/1967 | Christman ..................... | 260/80.5 |
| 3,328,366 | 6/1967 | Nakaguchi et al. ............ | 260/88.2 |
| 3,349,064 | 10/1967 | Gumboldt et al. ............. | 260/80.7 |
| 3,380,981 | 4/1968 | Miller et al. .................. | 260/93.7 |
| 3,462,399 | 8/1969 | Matthews ...................... | 260/80.78 |

Primary Examiner—Joseph L. Schafer
Assistant Examiner—Edward J. Smith
Attorneys—I. William Millen, Ted Raptes and John L. White ABSTRACT: Readily vulcanizable ethylene-olefin copolymers having a desired molecular weight range are produced on the basis of a Ziegler catalyst activated by a perchlorocrotonic acid halide or ester.

POLYMERS AND CATALYST COMPOSITIONS

BACKGROUND OF THE INVENTION

This invention relates to the production of high-molecular-weight amorphous copolymers of ethylene and at least one 1-olefin and/or polymerizable multiple olefin (a polyethylenically unsaturated monomer, such as allene) with the aid of a Ziegler catalyst, i.e., organometallic mixed catalysts consisting essentially of (A) compounds of the metals of Main Groups I to III of Mendeleeff's Periodic Table which contain at least one hydrogen atom or an alkyl or aryl group bound to the metallic atom, and (B) compounds of the metals of Subgroups IV to VI and VIII of said Periodic Table.

The production of amorphous copolymers from 1-olefins is generally conducted successfully with the aid of such Ziegler catalysts, particularly suitable catalysts being the combination of vanadium compounds and alkyl aluminum halides. These compounds are soluble in those inert solvents wherein the polymerization is conducted. There is the disadvantage, however, that the catalysts must be employed in a relatively high concentration since the amount of polymerizate formed per unit of catalyst is relatively small for industrial purposes. If this disadvantage is sought to be overcome by increasing the charge of monomer and by elevating the pressure, the catalyst activity is somewhat increased, but the molecular weight of the thus-produced polymers becomes so high that they can be processed only with difficulties. Besides, the relatively high molecular weight brings with it a high solution viscosity of the polymers, so that the removal of heat during the polymerization becomes a significant problem owing to the resultant low rates of heat transfer. Consequently, polymerization in conventional large reactors should be avoided because of technical and economic considerations.

It is known that the yield of polymerizate can be increased by the addition of halogenated organic compounds. Thus, in accordance with French Pat. No. 1,417,195, trihaloacetic acid, particularly the esters thereof, as well as hexachloroacetone, are listed as promoters. Furthermore, the use of hexachlorocyclopentadiene is also known from French Pat. No. 1,370,358. These compounds have been the most effective activators heretofore for the above-mentioned Ziegler catalysts.

However, such additives bring with them the disadvantage that they are not very effective at low concentration and that when employed in higher concentrations where they would have been of most use, they inhibit the catalyst instead. In other words, the curve for efficiency of all Ziegler type activators is a parable. Each activator has its specific maximum of efficiency at a distinct concentration, i.e., at low concentrations as well as at high concentrations resulting in minimum efficiencies. Extremely high concentrations cause trouble with the activator resulting in a decrease of the activity below 1 (see examples 1 to 10, table 1).

SUMMARY OF THE INVENTION

A principal object of this invention, therefore, is to provide more effective additives which can be employed in a far lower concentration and which do not deleteriously affect the Ziegler catalysts.

Another object is to provide novel catalyst compositions based on the activators of this invention.

Still another object is to provide novel polymers which are more readily vulcanizable than polymers produced without the activators of this invention.

Upon further study of the specification and claims, other objects and advantages of the present invention will become apparent.

The above objects are attained, in accordance with this invention, by conducting the polymerization process in the presence of perchlorocrotonic acid compounds of the formula $$Cl_3C \cdot CCl = CCl \cdot COX$$

wherein X can be a chlorine or bromine atom, or an OR-group, R being alkyl, cycloalkyl, aryl, or aralkyl, and optionally halogenated derivatives thereof.

DETAILED DISCUSSION OF THE INVENTION

In addition to ethylene, suitable 1-olefins are preferably those having 3–30 carbon atoms, including but not limited to such exemplary species as propylene, butene-(1), pentene-(1), hexene-(1), octene-(1), nonene-(1), decene-(1), as well as corresponding branched 1-olefins such as, for example, 4-methyl-pentene-(1). Whereas it is possible to copolymerize a single monoolefin such as, for example, ethylene or propylene with a multiple olefin, it is preferred to utilize mixtures of the above-mentioned 1-olefins, particularly those containing ethylene, preferably mixtures of ethylene and propylene, or ethylene and butene-(1), since they result in copolymers having optimum properties.

Multiple olefins suitable for copolymerization are generally polyethylenically unsaturated hydrocarbons of 5 to 20 carbon atoms and 2 to 6 ethylenically unsaturated bonds. Examples of such multiple olefins include, but are not limited to, cis- and trans-hexadiene-(1,4), hexadiene-(1,5), pentadiene-(1,4), 2-methyl-pentadiene-(1,4), 3-methyl-hexadiene-(1,4), decadiene-1,9), decatriene-(1,4,9), trivinylcyclohexane, dicyclopentadiene; alkenyl norbornenes such as 5-propenyl-, 5-(buten-yl)-, and 5-(2-methyl-buten-(2')-yl)-norbornene; alkylalkenyl norbornenes, such as, e.g., 5-methyl-6-propenyl-norbornene; alkylidene norbornenes, such as methylene and ethylidene norbornene, vinyl norbornene, cyclohexenyl norbornene, alkyl norbornadienes, such as methyl-, ethyl-, and propyl-norbornadiene; or cyclodienes, such as cyclooctadiene-(1,5).

The molar ratio of the monomers employed is dependent upon the desired composition of the copolymer and is influenced, inter alia, by the type of monomer. Since the monomers differ to a very great extent as to the energies of polymerization activation, universally applicable molar ranges cannot be set forth; however, in case of the copolymerization of ethylene with propylene, a molar ratio of 1:1 to 1:5, respectively, is preferred; and in the copolymerization of ethylene with propylene and dicyclopentadiene, alkenyl norbornene, alkylalkenyl norbornene, or alkylidene norbornene, a molar ratio of 1:1: 0.01 to 1:5:1, respectively, is preferable. However, even these preferred ranges can be changed, if a copolymerizate having special properties is desired. In generally all cases, high-polymers are produced.

With respect to the components of the Ziegler catalyst, suitable compounds of Main Groups I to III of Mendeleeff's Periodic Table containing at least one hydrogen atom or an alkyl or aryl group bound to the metallic atom are, for example, sodium amyl, lithium butyl, zinc diethyl, and particularly aluminum compounds, such as, aluminum trialkyl, triaryl, and triaralkyl compounds. Preferred species of the aluminum compounds include but are not limited to aluminum trimethyl, aluminum triethyl, aluminum triisobutyl, aluminum triphenyl, aluminum tri-(ethylphenyl), as well as mixtures thereof. More preferred are aluminum dialkyl monohalides, such as diethyl aluminum monochloride or diethyl aluminum monobromide, and also the monoalkyl aluminum dihalides, such as ethyl aluminum dichloride and ethyl aluminum dibromide. Of particular advantage are also the mixtures of equimolar amounts of dialkyl aluminum monochlorides and alkyl aluminum dichloride called alkyl aluminum sesquichloride, such as ethyl aluminum sesquichloride. Also suitable are alkyl aluminum hydrides, such as diethyl aluminum monohydride and diisobutyl aluminum monohydride.

Suitable compounds of Subgroups IV to VI and VIII of Mendeleeff's Periodic Table include but are not limited to titanium tetrachloride and chlorotitanic acid esters, such as dichlorotitanic acid diethyl ester ($Ti(OC_2H_5)_2Cl_2$), and most preferably vanadium compounds. Among the preferred species of vanadium compounds are: vanadium trichloride, vanadium tetrachloride, and vanadium oxytrichloride, as well as vanadium esters, such as vanadium triacetate ($V(OOC \cdot CH_3c3)$) and vanadium triacetylacetonate ($V(C_5H_7O_2)_3$).

The mixed catalyst contains the compounds of the metals of Main Groups I to III, on the one hand, and Subgroups IV to VI and VIII, on the other hand, in a preferred molar ratio of 20:1 to 5:1,: more preferably 15:1, to 1 10:1.

For additional details and description of Ziegler catalysts that can be employed in this invention, attention is directed to U.S. Pat. 3,326,872, and patents cited therein, Gaylord and Mark, "Linear and Stereoregular Addition Polymers," 1959, Interscience, particularly at pages 90–106 and 491, 2; Houben Weyl, Methoden der organischen Chemie, Vol. XIV/1 (1961), pages 578 to 585 and pages 619 to 620; Ullmann, Enzyklopadie der technischen Chemie, 3rd Edition, Vol. 14 (1963), pages 49 and 173. The mixed catalyst is preferably employed in amounts of 0.5 to 20.0 g., based on 1 liter of solvent.

The novel activators of this invention are perchlorocrotonic acid compounds having a perchlorocrotonyl residue. Such compounds include crotonic acid halides:

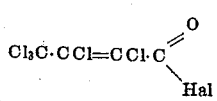

wherein Hal represents a chlorine or bromine atom; and especially the esters of perchlorocrotonic acid of the general formula:

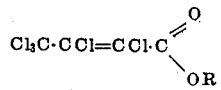

wherein R represents a straight-chain or branched aliphatic residue of one–is carbon atoms, or a cycloaliphatic residue of three–12 carbon atoms, or an aromatic residue of six–14 carbon atoms. The saturated and the unsaturated cyclic residues can be optionally substituted by one or several aliphatic straight-chain or branched residues. Furthermore, the residue R can be optionally partially halogenated or perhalogenated.

The following esters of perchlorocrotonic acid are particularly suitable: methyl-, ethyl-, propyl-, iso-propyl-, n-butyl-, sec.-butyl-, iso-butyl-, tert.-butyl-, n-pentyl-, n-hexyl-, n-hepthyl-, 2-methyl-hexyl-, 2-ethyl-hexyl-, n-octyl-, n-nonyl-, n-decyl-, and n-dodecyl-; cyclopropyl-, cyclopentyl-, cyclohexyl-, cyclooctyl-, cyclodecyl-, and cyclo-dodecyl-; phenyl-, o-, m-, and p-cresyl-, α- and β-naphthyl-; 2,3,3,3-tetrachloropropyl-, 2,4,4,4-tetrachlorobutyl-, and 3,5,5,5-tetrachloropentyl-; mono-, di-, tri-, tetra-, and pentachloro- or bromophenyl-, such as, for example, 2-chlorophenyl-, 3-chlorophenyl-, 4-chlorophenyl-, 2,3-dichlorophenyl-, 2,4-dichlorophenyl-, 2,5-dichlorophenyl-, 2,6-dichlorophenyl-, 2,4,6-trichlorophenyl-, 2,3,4,6-tetrachlorophenyl-, and pentachlorophenyl-; 2-chlorcyclopentyl-, 2,2-dichlorcyclopentyl, 3-chlorcyclopentyl-, 3,4-dichlorcyclopentyl-, 3,3-dichlorocyclopentyl-, 3,3,4-trichlorcyclopentyl-, 3,3,4,4-tetrachlorcyclopentenyl-, 2,2,3,3,4,4,5,5-octachlorcyclopentyl-; 2-chlorcyclohexyl-, 3-chlorcyclohexyl-, 4-chlorcyclohexyl-, 2,2-dichlorcyclohexyl-, 2,3-dichlorcyclohexyl-, 2,4-dichlorcyclohexyl-, 2,5-dichlorcyclohexyl-, 2,6-dichlorcyclohexyl-, 2,3,4-trichlorcyclohexyl-, 3,4,5-trichlorcyclohexyl-, 2,2,3-trichlorcyclohexyl-, 2,3,3-trichlorcyclohexyl-, 2,2,4-trichlorcyclohexyl-, 2,3,4-trichlorcyclohexyl-, 2,4,4-trichlorcyclohexyl-, 2,2,5-trichlorcyclohexyl-, 2,5,5-trichlorcyclohexyl-, 2,2,6-trichlorcyclohexyl-; 2,2,3,3-tetrachlorcyclohexyl-, 2,2,4,4-tetrachlorcyclohexyl-, 2,2,5,5-tetrachlorcyclohexyl-, 2,2,6,6-tetrachlorcyclohexyl-, 2,3,4,5-tetrachlorcyclohexyl-, 2,4,5,6-tetrachlorcyclohexyl-, 2,3,4,5,6-pentachlorcyclohexyl-, 2,3,4,5,6-decachlorcyclohexyl-, and analogue partially or perchlorinated cycloheptyl-, cyclooctyl-, cyclononyl-, cyclodecyl-, cyclododecyl residues.

The perchlorocrotonic acid compounds are employed in preferred concentrations of 0.1 to 5, more preferably 0.5 to 2.0 millimols per 1 millimol of component (B) e.g., a vanadium compound, or per 5 to 20 millimols of component (A) e.g., an organoaluminum compound.

The perchlorocrotonic acid halides and perchlorocrotonic acid esters are preferably produced from relatively inexpensive and readily available hexachlorobutadiene as the starting material. The reaction is conducted by conventional methods, such as described in A. Roedig and P. Bernemann, Leibigs Annalen 600, page 1, 1956, and elsewhere. Hexachlorbutadiene is reacted with sodium ethylate to 1-ethoxypentachlorbutadiene, being transformed by treatment with chlorine under the exclusion of light to perchlorocrotonic acid chloride. The latter compound and the corresponding hydroxy compounds yield the corresponding esters.

The perchlorocrotonic acid compounds can be introduced into the polymerization reactor either separately from the other catalyst components or together with the solution of the other catalyst components. The activator becomes no part of the final copolymer.

Particularly preferred combinations of activated Ziegler catalysts are as follows:

[In the combinations 1 to 9 VOCl₃ may be substituted by VCl₄ and Al₂(C₂H₅)₃ Cl₃ by Al₂(CH₃)₃Cl₃]

| | Component (A) | Component (B) | Activator Cl₃C·CCl=CCl·C(=O)—X  X means |
|---|---|---|---|
| 1 | Al₂(C₂H₅)₃Cl₃ | VOCl₃ | —OCH₃ |
| 2 | Same | Same | —OC₂H₅ |
| 3 | do | do | n-OC₄H₉ |
| 4 | do | do | sek.—OC₄H₉ |
| 5 | do | do | —OCH₂CHClCH₂CCl₃ |
| 6 | do | do | —O—⟨phenyl⟩ |
| 7 | do | do | —O—⟨2,3,5,6-tetrachlorophenyl⟩ |
| 8 | do | do | —Cl |
| 9 | do | do | —Br |
| 10 | Al(C₂H₅)₂Cl | V(C₅H₇O₂)₃ | —OCH₃ |
| 11 | Same | Same | —OC₂H₅ |
| 12 | do | do | —n—OC₄H₉ |
| 13 | do | do | —sek.—OC₄H₉ |
| 14 | do | do | —OCH₂CHClCH₂CCl₃ |
| 15 | do | do | —O—⟨p-methylphenyl⟩ |
| 16 | do | do | —O—⟨2,3,5,6-tetrachlorophenyl⟩ |
| 17 | do | do | —Cl |
| 18 | do | do | —Br |

In the combinations 10 to 18 V(C₅H₇O₂)₃ may be substituted by V(OOC·CH₃)₃ or VCl₄ resp. Al(C₂H₅)₂Cl by Al(C₂H₅)₃.

The copolymerization can be conducted in the liquefied monomers under pressure. However, the process is preferably conducted in the presence of inert solvents, for example, in hydrocarbons or hydrocarbon mixtures, such as butane, pentane, hexane, cyclohexane, isopropylcyclohexane, which are liquid under the reaction conditions, gasoline fractions, such as petroleum ether; also, benzene, toluene, and xylene, as well as chlorinated hydrocarbons, such as tetrachloroethylene or chlorobenzene, and mixtures thereof. Particularly suitable are mixtures of aliphatic and cycloaliphatic hydrocarbons, for example, hexane and isopropyl-cyclohexane, the proportion of aliphatic to cycloaliphatic being about 1:5 to 5:1.

The reaction proceeds especially smoothly when the mixed catalysts are dissolved or colloidally dispersed in the solvents used in this process. In this connection, readily dispersible or soluble catalysts are the reaction products obtained by combining vanadium compounds, such as vanadium tetrachloride, vanadium oxytrichloride, or vanadium esters, with organometallic compounds of aluminum, such as aluminum triethyl, aluminum triisobutyl, aluminum trihexyl, diethyl aluminum monochloride, or ethyl aluminum sesquichloride, in an inert solvent.

The copolymerization proceeds within a very wide temperature range; preferable temperatures range between −30° C. and +60° C.

The reaction is accomplished without the use of increased pressure at a sufficient speed, but it can also be conducted under elevated pressure, for example, anywhere from atmospheric pressure to 25 atmospheres. The polymerization, preferably conducted in a continuous manner, is terminated in a conventional manner by adding hydrogen-active substances, such as water, alcohols, or carboxylic acids.

The effectiveness of the perchlorocrotonic acid compounds upon the organometallic mixed catalyst stems mainly from the perchlorocrotonyl residue. By employing suitable residues R, the activity of the activator can be controlled. For example, the ethyl ester of perchlorocrotonic acid is more effective than the methyl ester, and the butyl esters are even more effective than the ethyl ester.

Perchlorocrotonic acid halides and perchlorocrotonic acid esters raise the yield of polymerization and lower the viscosity of the copolymerizate. An exception is represented by those perchlorocrotonic acid esters having a halogenated residue R. Thus, the perchlorophenyl ester of perchlorocrotonic acid, for example, increases the polymerization velocity by a similar order of magnitude as the aliphatic esters, but does not lower the viscosity of the copolymerizate. This special property of the perhalogenated esters of perchlorocrotonic acid can be utilized when it is intended to produce copolymers of the above-mentioned type in high yields and with a high viscosity. Furthermore, the viscosity of the copolymer can be varied by simultaneously employing aliphatic perchlorocrotonic acid esters and perhalogenated perchlorocrotonic acid esters, i.e., an activator mixture. Preferred species of such mixtures include, but are not limited to, perchlorocrotonic acid methylester with perchlorocrotonic acid-n-butylester, perchlorcrotonic acid methylester with perchlorocrotonic acid-sec.-butylester, perchlorocrotonic acid methylester with perchlorocrotonic acid phenylester, perchlorocrotonic acid methylester with perchlorcrotonic acid-pentachlorphenylester, perchlorcrotonic acid methylester with perchlorcrotonic acid-o-cresylester, perchlorcrotonic acid methylester with perchlorcrotonic acid- 2,4,4,4-tetrachlorbutylester. By substituting in the above-mentioned mixtures perchlorcrotonic acid methylester by perchlorcrotonic acid ethylester or perchlorcrotonic acid- 2-ethylhexylester further combinations of activators are to be obtained.

Mixtures of perchlorocrotonic acid esters and perchlorocrotonic acid halides can also be employed with a particular advantage. The RSV (reduced specific viscosity) values of the polymers produce in this manner are markedly higher than in polymers obtained with the addition of equivalent amounts of the perchlorocrotonic acid ester of the perchlorocrotonic acid halides (chloride or bromide) by itself. Consequently, this type of mixture also decreases the lowering of the polymer viscosity, without there being a drop-off in the yield of polymer.

The polymers produced on the basis of this invention are more readily vulcanizable than polymers produced under the same conditions, but with different activators. By the use of perchlorcrotonic acid compounds for the preparation of unsaturated terpolymers the monomer becomes part of the copolymer in a quite uniform distribution. Likewise this result cannot be obtained by using trichloracetic acid methylester, hexachloracetone or hexachlorcrotonic acid compounds. Furthermore perchlorcrotonic acid compounds cause an additional activity of the less reactive monomers resulting in a significant higher $C_3$-content of ethylene-propylene-copolymers compared with those copolymers obtained by the use of common activators. Finally even dienes get part of the copolymer in an optimal regularity along the polymer chain.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

EXAMPLES 1-10

The extent of catalyst activation is determined, based on an ethylene-propylene copolymerization, in the apparatus described by H. Schneck et al. in "Die Makromolekulare Chemie" (Macromolecular Chemistry), Volume 69, page 105 (1963), as follows;

The apparatus operates in a similar manner as that conventionally employed for catalytic hydrogenation. Two gas burettes contain equal volumes of ethylene and propylene and are in communication with the reaction vessel which is a 500 ml. round flask provided with an agitator and thermometer. The catalyst is prepared in the reaction vessel, the solvent being isopropylcyclohexane. Using conventional techniques, 1 millimol $VOCl_3$ and 12 millimols ethyl aluminum sesquichloride in 100 ml. isopropylchclohexane (IPCH) are added to the reactor. The activator is added immediately after the organoaluminum compound. After the apparatus is sealed, the copolymerization is conducted at 30° C., for a period up to 15 minutes, the agitator velocity being 340 r.p.m. During each series of experiments, the control value is determined, i.e., the absorption of olefin without the activator. The control value ranges between 900 and 1,000 ml. ethylene +propylene.

The activator is added in amounts of 0.1–5.0 millimols/liter. Generally, four to five different activator concentrations are examined. The volumetric olefin absorption per minute is plotted graphically to indicate the extent of polymerization per unit time. In the following tables, the numbers represent the relative extent of polymerization (activity factor) as compared with a nonactivated control value which is equal to 1.

For each trial charge, the polymerizate is isolated in a conventional manner, and the viscosity then determined. For purposes of simplicity, the specific RSV-values are not set forth in table 1, but are only listed qualitatively by—(lowering) and = (no change). Time of polymerization is given in minutes in parentheses; and if no time is stated, the reaction period is 15 minutes.

The last column of the table shows in which concentration the activator inhibits the catalyst.

Table 1 shows that the tested perchlorocrotonic acid esters, as well as perchlorocrotonic acid chloride and bromide are effective. In other than one exception (example 7b), the RSV-value is reduced, and the catalyst inhibition is weak or cannot be detected at all.

The most effective activators are the n-butyl and the sec.-butyl esters. At a concentration of 1.0 millimol/liter, these esters reach 2.15-fold olefin absorption in a short period of time and are thus substantially superior to the methyl ester of trichloroacetic acid and hexachlorocyclopentadiene, comparative examples 9 and 10.

TABLE 1

[100 ml. IPCH (isopropylcyclohexane); 1 mmol VOCl₃ per liter; 12 mmols ethyl aluminum sesquichloride per liter; ethylene:propylene=1:1 volume; 30° C.]

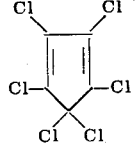

| | Activator | Activator addition in mmol/l. activity factor | | | | | | RSV + | Concentration yielding catalyst inhibition |
|---|---|---|---|---|---|---|---|---|---|
| | | 0.1 | 0.5 | 1.0 | 2.0 | 3.0 | 5.0 | | |
| Example: | | | | | | | | | |
| 1 | Cl₃C·CCl=CCl·COOR R=CH₃ | | 1.14 | 1.18 (13') | | 2.06 (8') | | | None. |
| 2 | R=C₂H₅ | | | 1.62 | 2.16 (8') | | | 1.54 | 10 mmol. |
| 3 | R=C₄H₉ | | | 1.63 | 2,15 (8') | | | | None. |
| 4 | R=sec. C₄H₉ | 1.11 | 1.52 (13') | 2.15 (6') | | 2.00 (7') | 1.76 (9') | | None—up to 5 mol. |
| 5 | R=2-ethylhexyl | 1.48 | 1.74 | 1.36 | | 1.32 | | | Do. |
| 6 | R=o-cresyl | 0.92 | 1.36 | 1.74 (10') | | 1.80 (10') | | | >5 mmol. |
| 7a | R=2,4,4,4-tetrachlorobutyl | 1.02 | 1.56 | 1.70 | 1.86 | 2.00 | | | >7.5 mmol. |
| 7b | R=pentachlorophenyl | | | 2.03 (14') | 2.05 (14') | 1.64 (14') | 0.87 = | | >3 mmol. |
| 8a | Cl₃C·CCl=CCl·COCl | 1.28 | | 1.40 | 1.80 | 1.40 | | | >10 mmol. |
| 8b | Cl₃C·CCl=CCl·COBr | 1.32 | | 1.55 | 1.75 | 1.60 | 1.30 | | Do. |
| 9++ | Cl₃C·COOCH₃ | | 1.32 | 1.40 | 1.55 | 1.84 | 1.64 | | Do. |
| 10++ | (structure shown) | | 1.0 | 1.28 | 1.68 | 1.70 | 1.72 | | |

+ Means reduction.
++ Means comparative examples.
= Means no change of the RSV value.

EXAMPLE 11

When employing, in the above-described apparatus, only half the amount of catalyst used in Examples 1–10, i.e., 0.5 millimol vanadium oxytrichloride and 6.0 millimols ethyl aluminum sesquichloride per 1,000 ml., with a reaction period of 15 minutes at 30° C., the ethylene-propylene absorption is 550 ml., the RSV-value is 1.49, and the amount of polymerizate is 0.62 g.

Upon the addition of 1.0 millimol of the sec.-butyl ester of perchlorocrotonic acid, and a reaction period of only 7 minutes at 30° C., the ethylene-propylene consumption is 1,870 ml., the RSV-value is 0.45, and the yield in polymerizate is 2.05 g. The activity factor, calculated from the olefin absorption, is 3.4, and calculated from the yield, is 3.3.

EXAMPLES 12–15

Examples 12–15 listed in table 2 are obtained in a continuous process under the following reaction conditions:
0.5 mmol VOCl₃/liter hexane,
6.0 mmol ethyl aluminum sesquichloride/liter hexane,
molar feed ratio of ethylene:propylene:dicyclopentadiene = 1:2:0.025, ethylene feed rate is 60 liters/hour. The operating conditions average residence time in the reactor 60 minutes,

TABLE 2

| Catalyst | | Mmol activator/ liter hexane | Solids, percent by weight | Grams polymer/ grams VOCl₃ | Grams polymer/ ethyl-Al- sesqui- chloride | ML-4 |
|---|---|---|---|---|---|---|
| Example: | | | | | | |
| 12++ | None | | 3.0 | 236 | 28 | 78 |
| 13++ | Cl₃C·COOCH₃ | 1 | 4.6 | 361 | 42 | 60 |
| | | 2 | 5.1 | 402 | 47 | |
| 14a | Cl₃C·CCl=CCl·C(=O)Cl | 0.5 | 5.2 | 408 | 48 | 33 |
| | | 1 | 6.0 | 472 | 55 | 9 |
| | | 2 | 5.5 | 432 | 50 | 2 |
| 14b | Cl₃C·CCl=CCl·C(=O)Br | 0.5 | 5.1 | 402 | 47 | 35 |
| | | 1 | 6.0 | 472 | 55 | 11 |
| | | 2 | 6.0 | 472 | 55 | 7 |
| 15 | Cl₃C·CCl=CCl·COOC₂H₅ | 1 | 6.0 | 472 | 55 | 30 |
| | | 2 | 6.9 | 542 | 63 | 12 |

++Means comparative examples.

From the above table 2, the effectiveness of the perchlorocrotonic acid derivatives is shown to be increased as compared to the methyl ester of trichloroacetic acid. The solids content, as compared to the experiment without an activator, is maximally increased by the following multiples: Cl₃C·COOC₂H₃ yields an increase by 1.7 times; Cl₃CCCl CCl·COCl results in a 2.0-fold increase; and Cl₃CCCl temperature of 35° C., pressure of 1 atmosphere absolute.

CCl·COOC₂H₅ yields a 2.3-fold increase. These values are substantially consistent with the data determined volumetrically in the discontinuous procedures (see examples 1–11).

EXAMPLES 16–27

In a glass apparatus, ethylene, propylene, and trans-hexadiene-(1,4) are continuously copolymerized in hexane with vanadium oxytrichloride and ethyl aluminum sesquichloride at 30° C. Within 4 hours, there are employed 6 millimols vanadium oxytrichloride and 72 millimols ethyl aluminum sesquichloride, each respectively dissolved in a separate liter of hexane.

The termonomer and the activator substance are dissolved together in 2.5 liters of hexane. The above-mentioned solutions are added dropwise within 4 hours with agitation and simultaneous introduction of ethylene and propylene into the reaction vessel initially charged with 1.5 liters of hexane. The polymerization solution is then passed into a second vessel wherein the polymerization is terminated by the dropwise addition of butanol (in total, 200 ml.) to which 1.5 ml. stabilizer were added, and is finally conducted into a third vessel wherein the polymerizate is washed with water. After phase separation, the hexane solution is mixed with 1.5–2 liters of acetone, and the precipitated terpolymerizate is stirred overnight with acetone and then dried under vacuum at 50° C.

The reduced specific viscosity (RSV) of the polymer is measured as a 0.1 percent solution in p-xylene at 110° C. The gel values are always lower than 2 percent by weight.

The results of the experiments are contained in the following tables 3, 4, and 5:

the unsaturation is 3.4 c C/1,000 carbon atoms. The RSV-value of 1.15 is markedly higher than in example 17, where it is 0.45. Under similar conditions, the RSV-value is 0.60 when adding 0.8 mmol/l. of perchlorocrotonic acid chloride.

Table 3 demonstrates the increase in solids content and the decrease in viscosity when adding activator quantities below the optimum of the concentrations listed in table 1. Higher activator concentrations lead to still higher yields in polymerizate. The propylene content in the terpolymer is apparently increased by the addition of perchlorocrotonic acid ethyl ester.

Even when adding subthreshold amounts of the novel activators, this invention yields higher solids contents than the comparative examples 24a–24d, relating to hexachlorocyclopentadiene, even though quantitatively lesser amounts of activator are employed (as can be seen by comparing examples 21a, 21b and examples 22 and 23 with examples 24a, 24b, 24c, and 24d).

The reduction in viscosity is substantially more pronounced in examples 21a, 21b, and 22 than in case of hexachlorocyclopentadiene. On the other hand, the pentachlorophenyl ester of perchlorocrotonic acid does not produce any lowering of the viscosity (cf. examples 20 and 23). Furthermore, the novel activators effect a higher copolymerization of propylene.

Half of the amount of catatlyst employed in these experiments, namely 0.521 g. VOCl₃ and 4.45 g. ethyl aluminum sesquichloride, still results in a satisfactory catalyst activity, if there is added, for example, 0.75 mmol (=0.215 g.) of perchlorocrotonic acid ethyl ester. The solids content

TABLE 3

[Terpolymerization of Ethylene: Propylene: trans-Hexadiene-(1,4) = 1:1:0.06 in the Presence of Perchlorocrotonic Acid Ethyl Ester]

| Example: | Perchlorocrotonic acid ethyl/ester in 4 hours | | Temperature, °C. | Yield, grams | Solids percent by weight | Grams polymer/grams VOCl₃ | Grams polymer/grams Al-sesquichloride | RSV | Percent by weight C₃ | C=C/1,000 from iodine number |
|---|---|---|---|---|---|---|---|---|---|---|
| | Mmol/liter hexane | Grams | | | | | | | | |
| 16 | | | 30 | 152 | 3.65 | 146 | 17.0 | 0.91 | 51 | 4.1 |
| 17 | 0.8 | 1.373 | 30 | 229 | 5.72 | 220 | 26.7 | 0.45 | 53 | 3.1 |
| 18 | | | 0 | 200 | 5.00 | 182 | 22.5 | 1.25 | 54 | 3.6 |
| 19 | 0.4 | 0.686 | 0 | 268 | 6.70 | 267 | 30.2 | 0.80 | 57 | 3.1 |

TABLE 4

[Terpolymerization of ethylene: Propylene: 5-(cis-Buten-(2′)-yl)norbornene-1:1.5:0.015 in the presence of perchlorocrotonic acid esters as compared to hexachlorocyclopentadiene]

| Example: | Activator Cl₃C—CCl=CCl—COOR | In 4 hours— | | Temperature, °C. | Yield, grams | Solids, percent | Grams polymer, grams VOCl₃ | Grams polymer, grams Al-sesquichloride | RSV | ML-4 | Weight percent C₃ | C=C/1,000 from iodine number |
|---|---|---|---|---|---|---|---|---|---|---|---|---|
| | | mmol/liter hexane | Grams | | | | | | | | | |
| 20 | None | | | 30 | 185 | 4.88 | 178 | 20.8 | 1.36 | 40 | 50 | 3.3 |
| 21a | R=C₂H₅ | 0.4 | 0.686 | 30 | 285 | 7.13 | 274 | 32 | 0.80 | 20 | 57 | 2.9 |
| 21b | Same | 1.0 | 1.716 | 30 | 338 | 8.45 | 325 | 38 | 0.46 | <20 | 59 | 2.3 |
| 22 | R=nC₄H₉ | 0.8 | 1.509 | 30 | 299 | 7.48 | 268 | 32.5 | 0.56 | | 59 | 2.3 |
| 23 | 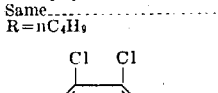 | 0.12 | 0.379 | 30 | 254 | 6.35 | 244 | 28.5 | 1.36 | 40 | 58 | 3.1 |
| 24a[1] | 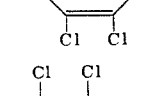 | 0.12 | 0.196 | 30 | 205 | 5.1 | 196 | 23.0 | 1.33 | 38 | 51 | 3.3 |
| 24b[1] | | 1.2 | 1.964 | 30 | 229 | 5.72 | 220 | 25.7 | 1.28 | 35 | 51 | 3.2 |
| 24c[1] | | 2.0 | 3.274 | 30 | 240 | 6.0 | 230 | 27.0 | 1.24 | 35 | 54 | 3.3 |
| 24d[1] | | 4.0 | 6.548 | 30 | 280 | 7.0 | 270 | 31.5 | 1.13 | 30 | 55 | 2.4 |

[1] Comparative examples.

When operating as in examples 17, but employing, in place of 0.8 mmol/l. perchlorocrotonic acid ethyl ester, a mixture per liter of 0.4 mmol perchlorocrotonic acid ethyl ester and 0.4 mmol perchlorocrotonic acid chloride, a polymer yield of 240 g. is obtained. The C₃ content is 52 percent by weight, and amounts to 4.55 percent and there are obtained per 1 g. VOCl₃ 350 g., and per 1 g. ethyl aluminum sesquichloride 41 g. of polymerizate, the RSV being 1.36 ML-4=40. Compare, in this connection, example 20.

In the following table 5, the vulcanization results are compared of the ethylene-propylene-5-(cis-buten-(2')-y1)-norbornene terpolymers produced with the novel activators to the terpolymerizates activated with hexachlorocyclopentadiene.

The vulcanization velocity ($t_{90}$—and $t_E$-values) in examples 21a and 23 is markedly higher than in comparative example 24c. Apparently, the perchlorocrotonic acid esters effect a more favorable incorporation of the diene into the ethylene-propylene chain (statistical distribution).

The values for the elongation at rupture are likewise improved over the values of example 24c.

For a vulcanization process conducted without the utilization of a filler, the following recipe is employed:

| | |
|---|---|
| Polymerizate | 100 Parts by Weight |
| Zinc Oxide | 5 Parts by Weight |
| Tetramethylthiuram disulfide | 1.5 Parts by Weight |
| Sulfur | 1.5 Parts by Weight |

The vulcanizates filled with HAF carbon black (HAF = high abrasion furnace) are obtained with the following recipe:

| | |
|---|---|
| Polymerizate | 100 Parts by Weight |
| Stearic acid | 1 Parts by Weight |
| Zinc oxide | 5 Parts by Weight |
| HAF Carbon Black | 50 Parts by Weight |
| Naphthenic oil | 10 Parts by Weight |
| Tetramethylthiuram disulfide | 1 Parts by Weight |
| 2-Mercaptothiazole | 0.5 Parts by Weight |
| Sulfur | 1 Parts by Weight |

For both types of vulcanization processes, the temperature was 160° C.

If vanadium tetrachloride is employed in example 26 in place of vanadium oxytrichloride, comparative results are obtained.

Similar results are produced with the mixed catalyst of vanadium triacetylacetate and diethyl aluminum monochloride at −20° C.

EXAMPLES 24-30

Of even higher effectiveness are the perchlorocrotonic acid esters when utilized in the economically advantageous stepwise process. This process is conducted in three series-connected 3-liter glass reactors filled to two-thirds thereof. The addition of the catalyst ($VOCl_3$ and ethyl aluminum sesquichloride) takes place only in the first reactor, whereas the activator (perchlorocrotonic acid ethyl ester) is introduced into all three reactors.

These examples illustrate the continuous terpolymerization of ehtylene, propylene, and 5-(2'-methyl-buten-(2')-yl)-norbornene; ehtylene, propylene, and 5-(cis-buten-(2')-yl)-norbornene and ethylene, propylene, and dicyclopentadiene.

The molar feed ratio is, in each case, ethylene:propylene:diolefin = 1:2.0:0.025. The other reaction conditions are: 0.5 mmol $VOCl_3$/liter hexane and 6.0 mmols ethyl aluminum sesquichloride/liter hexane. When terpolymerizing with dicyclopentadiene, 60 liters of ethylene and 120 liters of propylene per hour are introduced in the gaseous phase. When using 5-(2'-methyl-buten-(2')-yl)-norbornene and 5-(cis-buten-(2')-yl)-norbornene, 75 liters of ethylene and 150 liters of propylene are introduced per hour. The pressure is 1 atmosphere absolute, the temperature is 10° C., and

TABLE 5

[Vulcanization of terpolymers from ethylene, propylene and 5-(cis-buten-(2')-yl)-norbornene (1:2:0,02) prepared in the presence of perchlorcrotonic acid ethylester as compared to hexachlorcyclopentadiene]

| $Cl_3C \cdot CCl = CCl \cdot C\overset{O}{\underset{OR}{/\!/}}$ | | | Without $1/Q_{max}$ | Filler soluble components percent | Vulcanization data 160° C./120 minutes | | | | | | | | | |
|---|---|---|---|---|---|---|---|---|---|---|---|---|---|---|
| | | | | | Tensile strength, kg./cm.² | Elongation percent | Modulus 300° in minutes | | | | Permanent elongation | Hardness, degree shore | Elasticity 22° | c-75° |
| | $t_{90}$ | $t_E$ | | | | | 15 | 30 | 60 | 120 | | | | |
| Ex.: | | | | | | | | | | | | | | |
| 21a... R=C₂H₅ | 9' | 20' | 0.25 | 3.3 | 218 | 490 | 92 | 131 | 143 | 137 | 11 | 65 | 48 | 50 |
| 23... 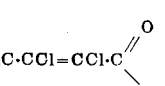 | 9' | 15' | 0.26 | 3.9 | 205 | 523 | 64 | 86 | 85 | 90 | 10 | 61 | 40 | 43 |
| 24c... 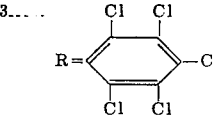 | 11' | 35' | 0.24 | 3.9 | 226 | 441 | 109 | 145 | 150 | 150 | 13 | 60 | 48 | 48 |

The terpolymerization of methylbutenyl norbornene with the above-mentioned catalyst mixture leads, in the presence of perchlorocrotonic acid ethyl ester, to solids contents of above 10 percent and to RSV-values of about 1. Trichloroacetic acid methyl ester lowers the molecular weight to a lesser extent and yields a lower solids content (see table 6).

the average residence time is 1 hour. The hourly throughput is 2 liters of hexane.

In each reactor, 0.7 mmol/liter of perchlorocrotonic acid ethyl ester is added. With conversions of 50 percent, there are obtained in examples 29 and 30, 14 percent by weight of solids, and in examples 28, 11 percent by weight of solids.

TABLE 6

[Terpolymerisation of ethylene, propylene and 5-(2'-methyl-buten-(2')-yl)-norbornene (1:2:0,02) in the presence of perchlorcrotonic acid ethylester as compared to trichloracetic acid methylester]

| Activator | In 4 hours | | Yield grams | Solids percent | Grams polymer/ grams $VOCl_3$ | Grams polymer/ grams Al-sesqui-chloride | RSV | Weight percent $C_3$ | C=C/ 1,000 C from Iodine number |
|---|---|---|---|---|---|---|---|---|---|
| | Mmol/ liter hexane | Grams | | | | | | | |
| Example: | | | | | | | | | |
| 25 [1] ... None | | | 246 | 6.2 | 237 | 27.7 | 2.73 | 51 | 3.5 |
| 26 ... $Cl_3C-CCl=CCl-COOR$ $R=C_2H_5$ | 0.8 | 1.373 | 432 | 10.8 | 415 | 48.5 | 1.03 | 61 | 3.4 |
| 27a ... } $Cl_3C-COOCH_3$ | 0.8 | 1.016 | 299 | 7.5 | 278 | 33.5 | 1.85 | 56 | 3.4 |
| 27b ... } | 1.2 | 1.270 | 328 | 8.2 | 315 | 37.0 | 1.81 | 59 | 3.3 |

[1] Instead of 0.02 only 0.015 mol methylbutenyl norbornene, because otherwise the viscosity is too high.

When employing trichloroacetic acid methyl ester, in place of perchlorocrotonic acid ethyl ester, the conversions decrease by about 50 percent.

Table 7 summarizes the results of these experiments:

A main advantage of this invention is that the perchlorocrotonic acid compounds are surprisingly more effective than, for example, hexachloroacetone, trihaloacetic acid esters, and hexachlorocyclopentadiene. By the use of the novel additives, the polymerization activity is considerably increased, and the molecular weight of the polymers can be lowered. Both factors are of great importance for the economic production of such copolymers.

The mixed catalyst activated by the additive of this invention effects a raise in the reactivity of the comonomers. Ethylene-propylene copolymers and ethylene-propylene-multiple olefin terpolymers have a higher propylene content, as compared to the control experiment, when they were produced in the presence of perchlorocrotonic acid halogenides or perchlorocrotonic acid esters. The perchlorocrotonic acid compounds do not cause any inhibition of the catalyst, or only a minor one when added in very high dosages, and in this respect are superior to the known halogen-containing activators.

Surprisingly, the unsaturated copolymers obtained in accordance with this invention also exhibit better vulcanization properties. First, they are vulcanized considerably faster, and second, the values of elongation at rupture of the vulcanizates are improved.

A still further and very important advantage of this invention is that the above-demonstrated flexibility of the process permits, starting with the same mixture of monomers and the same catalyst, the production of copolymers differing substantially from one another with respect to the RSV-values and also the composition thereof. This is done by merely varying the type and amount of the perchlorocrotonyl compound added thereto.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit an scope thereof, can make various changes and modifications of the invention to adapt it to various usages and conditions. Consequently, such changes and modifications are properly, equitably, and intended to be, within the full range of equivalence of the following claims.

What is claimed is:

1. A catalyst composition consisting essentially of a Ziegler catalyst and at least one activator of the formula

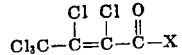

wherein X is Cl, Br, or OR, and R is selected from the group consisting of unsubstituted and halo-substituted alkyl, cycloalkyl, aryl and aralkyl; said Ziegler catalyst consisting essentially of:
   a. an organometallic compound of aluminum having at least one of hydrogen, alkyl or aryl attached to the aluminum atom, and
   b. a compound of vanadium, said activator being present in an amount sufficient to increase the yield of an olefinic polymerizate produced with said Ziegler catalyst.

2. A catalyst composition as defined by claim 1 wherein X is Cl or Br.

3. A catalyst composition as defined by claim 1 wherein X is n-butoxy or i-butoxy.

4. A catalyst composition as defined by claim 1 wherein a mixture of perchlorocrotonic acid esters is employed as the activator.

TABLE 7

| Diolefins | Reactors | | | | | | Yield per hour | Percent conversion | Grams polymer/ grams VOCl₃ | Grams polymer/ grams ethyl-Al-sesqui-chloride | Solids weight percent | RSV | Gel percent by weight | Iodine number | C=C/1,000 C | Propene mol percent | ML-4 |
|---|---|---|---|---|---|---|---|---|---|---|---|---|---|---|---|---|---|
| | 1st solids | | 2d solids | | 3d solids | | | | | | | | | | | | |
| | Weight percent | RSV | Weight percent | RSV | Weight percent | RSV | | | | | | | | | | | |
| Example: | | | | | | | | | | | | | | | | | |
| 28. Dicyclopentadiene | 7.7 | 2.0 | 9.7 | 1.85 | 10.9 | 1.7 | 147 | 51 | 848 | 99 | 10.8 | 1.9 | 4 | 7.5 | 3.9 | 59 | 78 |
| 29. Methylbutenylnorbornene | 10.5 | 1.7 | 12.9 | 1.8 | 14.2 | 1.7 | 190 | 53 | 1,100 | 128 | 14.0 | 1.4 | <2 | 6.2 | 4.8 | 54 | 35 |
| 30. cis-Butenyl norbornene | 10.0 | 1.9 | 12.4 | 1.8 | 13.8 | 1.8 | 185 | 52 | 1,068 | 125 | 13.6 | 1.85 | <2 | 7.0 | 3.6 | 61 | 50 |

5. A catalyst composition as defined by claim 1 wherein a mixture of a perchlorocrotonyl bromide or chloride with a perchlorocrotonic acid ester is employed as the activator.

6. A catalyst composition as defined by claim 1, wherein the molar ratio of $a$ to $b$ is 20:1 to 5:1 respectively.

7. A catalyst composition as defined by claim 1, wherein said activator is present in a molar ratio of from 0.1 to 5.0 millimols per millimol of component $b$.

8. A catalyst composition as defined by claim 7, wherein said molar ratio is 0.5 to 2.0 millimols of activator per millimol of component $b$.

9. A process for the production of amorphous polyolefins which process comprises copolymerizing ethylene with another olefin selected from the group consisting of a 1-olefin, a multiple olefin, and mixtures thereof, in the presence of a catalyst composition as defined by claim 1.

10. In a process for the production of amorphous copolymers of ethylene and at least one other olefinic monomer, the improvement which comprises employing a catalyst composition as defined by claim 1.

11. A process as defined by claim 10 wherein said copolymer comprises ethylene and propylene.

12. A process as defined by claim 11 wherein X is n-butoxy or i-butoxy.

13. A process for the production of amorphous polyolefins which process comprises copolymerizing ethylene with another olefin selected from the group consisting of a 1-olefin, a multiple olefin, and mixtures thereof, in the presence of a catalyst composition as defined by claim 6.

14. A process for the production of amorphous polyolefins which process comprises copolymerizing ethylene with another olefin selected from the group consisting of a 1-olefin, a multiple olefin, and mixtures thereof, in the presence of a catalyst composition as defined by claim 7.

15. A process for the production of amorphous polyolefins which process comprises copolymerizing ethylene with another olefin selected from the group consisting of a 1-olefin, a multiple olefin, and mixtures thereof, in the presence of a catalyst composition as defined by claim 8.

* * * * *

UNITED STATES PATENT OFFICE
CERTIFICATE OF CORRECTION

Patent No. 3,622,548                    Dated November 23, 1971

Inventor(s)  Hans Emde, Kurt Benedikter and Peter Hegenberg

It is certified that error appears in the above-identified patent and that said Letters Patent are hereby corrected as shown below:

In the Specification:

Col. 2, line 20, after "3-methyl-hexadiene-(1,4)," please insert ---4-methyl-hexadiene-(1,4),---;

Col. 2, line 21, "decadiene-1,9)" should be ---decadiene-(1,9)---;

Col. 2, line 74, "(V(OOC · CH$_3$c3)" should be ---(V(OOC · CH$_3$)$_3$)--

Col. 3, line 4, "15:1, to 1 10:1" should be ---15:1, to 10:1---;

Col. 3, line 36, "one-is" should be ---one-15---;

Col. 10, line 1, "c C/1,000" should be ---C=C/1,000---;

Col. 12, "EXAMPLES 24-30" should be ---EXAMPLES 28-30---;

Table 5, last column, "c-75°" should be ---75°---;

In the Claims:

Claim 1, after the colon, insert -- a. -- before first paragraph.

Signed and sealed this 28th day of November 1972.

(SEAL)
Attest:

EDWARD M. FLETCHER, JR.
Attesting Officer

ROBERT GOTTSCHALK
Commissioner of Patents